United States Patent [19]
Christman

[11] Patent Number: 4,588,803
[45] Date of Patent: May 13, 1986

[54] POLYURETHANE SEALANT COMPOSITIONS AND THEIR USE AS THERMAL-BREAK SEALANTS

[75] Inventor: Donald L. Christman, Grosse Ile, Mich.

[73] Assignee: BASF Corporation, Wyandotte, Mich.

[21] Appl. No.: 671,452

[22] Filed: Nov. 14, 1984

[51] Int. Cl.$^4$ .................. C08G 18/32; C08G 18/18
[52] U.S. Cl. .................................... 528/78; 521/164; 521/172
[58] Field of Search .............. 528/78; 521/164, 172

[56] References Cited

U.S. PATENT DOCUMENTS

| 3,336,245 | 8/1967 | Britain | 521/167 |
| 3,450,653 | 6/1969 | McClellan | 528/78 |
| 3,888,803 | 6/1975 | Doerge et al. | 521/167 |

Primary Examiner—Herbert S. Cockeram
Attorney, Agent, or Firm—Norbert M. Lisicki

[57] ABSTRACT

The invention relates to low shrinkage polyurethane sealant compositions which are prepared by reacting a mixture of a polyoxyalkylene polyether glycol, an ethylene oxide adduct of toluenediamine and triisopropanolamine with an organic polyisocyanate.

8 Claims, No Drawings

POLYURETHANE SEALANT COMPOSITIONS AND THEIR USE AS THERMAL-BREAK SEALANTS

BACKGROUND OF THE INVENTION

1. Field of the Invention

This invention pertains to the preparation of noncellular polyurethane sealant compositions containing ethylene oxide adducts of toluenediamine.

2. Description of the Prior Art

Those skilled in the art know that polyurethane sealant compositions can be prepared by mixing a polyol with an inorganic filler and reacting the mixture with a polyisocyanate. U.S. Pat. Nos. 3,450,653 and 3,484,517 are two examples of patents which disclose this teaching. The sealants disclosed in the prior art, however, have limited utility because their physical properties, such as tensile strength, hardness, brittleness, heat distortion, impact strength, and shrinkage resistance, have values which, although desirable for some uses, make them undesirable for other uses.

This application relates to a method for preparing sealants which are strong, flexible, and have low shrinkage. The sealants are prepared by mixing polyoxyalkylene polyether glycol or polyether glycol blend with an ethylene oxide adduct of toluenediamine and triisopropanolamine. The mixture is reacted with a polyisocyanate to form the polyurethane sealant. The prior art does not disclose this combination of ingredients or the significance of the combination.

SUMMARY OF THE INVENTION

Polyurethane sealants disclosed in the prior art have limited utility because one or more of their properties, such as tensile strength, hardness, brittleness, heat distortion, impact strength, and shrinkage have values which, although desirable for some uses, make them undesirable for other uses. This problem was solved by developing a polyurethane sealant composition prepared by (a) mixing a polyether polyoxyalkylene glycol or polyether glycol blend with an ethylene oxide adduct of toluenediamine and triisopropanolamine and (b) reacting the mixture of paragraph (a) with an organic polyisocyanate.

The polyurethane sealants thus prepared are strong, flexible, and have little or no shrinkage. They can be used for patching floors and roads, to make castings of wheels and rollers, as heat barriers in the manufacture of metal windows and door frames, and for other purposes.

DESCRIPTION OF THE PREFERRED EMBODIMENTS

The polyurethane sealants, which are the subject matter of this invention, are prepared by mixing a polyoxyalkylene polyether glycol or polyether glycol blend, an ethylene oxide adduct of toluenediamine and triisopropanolamine and reacting the mixture with a polyisocyanate. The reaction will occur at room temperature in the absence of catalyst. However, to increase the reaction rate, catalysts may be added or the initiation temperature of the reactants may be increased to an upper limit of about 120° F.

The polyurethane sealant compositions comprise the reaction product of (a) a polyoxyalkylene polyether glycol, (b) an ethylene oxide adduct of toluenediamine having a molecular weight range from about 300 to about 700, (c) triisopropanolamine, (d) optionally pigment, catalyst and inorganic filler, and (e) an organic polyisocyanate.

The ratio of the polyether glycol to the ethylene oxide adduct of toluenediamine may range from about 3:1 to 1:0.5, preferably from about 2:1 to about 1:1 parts by weight.

The ratio of the ethylene oxide adduct of toluenediamine to triisopropanolamine may range from about 20:1 to about 1:1, preferably from about 10:1 to about 2:1 parts by weight.

The polyoxyalkylene glycol or polyether glycol blend which were employed in the subject invention are well known in the art and are generally referred to as polyoxyalkylene polyether glycols. These glycols are prepared by the reaction of an alkylene oxide with a dihydric glycol. Alkylene oxides which may be employed in the preparation of the polyols of the present invention include ethylene oxide, propylene oxide, the isomeric butylene oxides, hexylene oxide, octylene oxide, dodecene oxide, methoxy and other alkoxy propylene oxides, and cyclohexene oxide. Styrene oxide may also be employed. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any above alkylene oxides may also be employed.

The polyoxyalkylene polyether glycols may have either primary or secondary hydroxyl groups and preferably are prepared from alkylene oxides having from 2 to 6 carbon atoms. The polyoxyalkylene polyether glycol may be prepared by any known process such as, for example, the process disclosed by Wurtz in 1859 and *Encyclopedia of Chemical Technology*, Vol. 7, pages 257–262, published by Interscience Publishers, Inc. (1951) or in U.S. Pat. No. 1,922,459.

Dihydric glycols which may be reacted with the alkylene oxides to prepare the polyalkylene ether polyols employed in the subject invention include ethylene glycol, propylene, glycol, diethylene glycol, dipropylene glycol, the isomeric butylene glycols, 1,5-pentane diol, and 1,6-hexanediol.

The ethylene oxide adduct of toluenediamine is prepared by reacting ethylene oxide with toluenediamine, preferably in the presence of an alkaline catalyst. This catalyst may be potassium hydroxide, sodium hydroxide, sodium and potassium methylate and other catalyst well known to those skilled in the art. The quantity of ethylene oxide employed is such that the molecular weight of the adduct may vary from about 300 to about 700.

Inorganic fillers may be mixed with the polyether glycols in an amount which is from 0.15 part to 0.7 part by weight per part of polyether polyol. Inorganic mineral fillers which can be used to mix with the polyether glycols are selected from the group consisting of calcium silicate, aluminum silicate, magnesium silicate, calcium carbonate and mixtures thereof. One of the functions served by the mineral filler is to reduce shrinkage of the sealant.

If too much filler is added, however, the viscosity of the glycol-filler mixture will be too high at room temperature. This will make it difficult to mix the glycol-filler component with the isocyanate component. The temperature of the glycol-filler component can be elevated to temperatures of 120° F. to decrease its viscosity and to promote better mixing with the isocyanate component. The viscosity of the glycol-filler component is also dependent upon the filler used. Calcium silicate will provide glycol-filler components with lower viscosities while aluminum silicate and magnesium silicate will provide glycol-filler components with higher viscosities.

The mixture of polyoxyalkylene polyether glycols and triisopropanolamine is reacted with an organic polyisocyanate such that the ratio of isocyanate groups of the polyisocyanate to the hydroxyl groups of the polyether polyol is 1.0:1 to 1.5:1 by weight. Organic polyisocyanates which may be used include aromatic, aliphatic, and cycloaliphatic polyisocyanates and combinations thereof. Representative examples are diisocyanates such as m-phenylene diisocyanate, 2,4-toluenediisocyanate, 2,6-toluenediisocyanate, mixtures of 2,4-toluenediisocyanate and 2,6-toluenediisocyanate, hexamethylene diisocyanate, tetramethylene diisocyanate, 1,4-cyclohexane diisocyanate, hexahydrotoluene diisocyanate, 1,5-naphthalene diisocyanate, 1-methyoxy-2,4-phenylene diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-4,4'-diphenylmethane diisocyanate; and triisocyanates such as 4,4'4"-triphenylmethane triisocyanate, polymethylene polyphenylene polyisocyanate and 2,4,6-toluene triisocyanate; and the tetraisocyanates such as 4,4'-dimethyl-2,2',5,5'-diphenylmethane tetraisocyanate. Especially useful due to their availability and properties are toluene diisocyanate, 4,4'-diphenylmethane diisocyanate and polymethylene polyphenylene polyisocyanate. Polymethylene polyphenylene polyisocyanate, which is most preferred, is a product which results from the phosgenation of an aniline-formaldehyde condensation product; it is sometimes called "crude MDI."

As was previously mentioned, catalysts may be used to increase the reaction rate. If catalysts are used, they are added to the mixture of the polyether glycol blend and inorganic filler before the reaction of the mixture with the polyisocyanate.

Urethane catalysts which may be employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, N-ethylmorpholine and diethylethanolamine may also be employed as well as mixtures of any of the above. Generally, the amount of urethane-promoting catalyst employed will be from 0.01 percent to 10 percent by weight based on the weight of the polyether polyol.

Although the polyurethane sealants prepared in accordance with the described process have many uses, they are particularly useful as thermal break barriers when used in the manufacture of metal window and door frames. Other sealants will shrink when they are used for this purpose. Applicants have found that polyurethane sealants prepared in accordance with this invention are shrink resistant or the shrinkage is minor.

Thermal break sealants are utilized as part of a composite consisting of a sealant, a metal extrusion and window glass. The sealant separates metal sections, one section of which is exposed to the outside of a building and the other section is exposed to indoor conditions. The sealant serves as a less conductive barrier to the transfer of heat from the warm side of the metal composite to the other. Although the sealant was originally used as a gap filler with good insulating properties, the same sealant is now considered as part of the structural component and desirably has good physical properties such as flexural modulus at elevated temperatures and little or no shrinkage. Thus, in the process of manufacturing metal doors and window frames, a polyurethane thermal break sealant may be employed comprising reacting (a) a polyoxyalkylene polyether glycol,
(b) an ethylene oxide adduct of toluenediamine having a molecular weight range from about 300 to abut 700,
(c) triisopropanolamine,
(d) optionally, pigment, catalyst and inorganic filler, and
(e) an organic polyisocyanate and pouring the resulting mixture into open channels and allowing the mixture to set in a hard thermal break elastomer.

The properties of the polyurethane sealants in the examples which follow were determined by the following ASTM test methods:

|  | Test Method |
| --- | --- |
| Tensile Strength | ASTM D638 |
| Elongation | ASTM D638 |
| Flexural Modulus | ASTM D790 |
| Shore D Hardness | ASTM D2240 |
| Heat Distortion | ASTM D648 |
| Notched Izod Impact | ASTKM D256 |

Initial shrinkage was measured by filling aluminum channels 12 inches long by ½ inch wide by ½ inch deep with the polyurethane sealant. The sealant was flush with the ends of the channels after curing before cycling. After filling the channels, the sealants were stored for 24 hours. Then shrinkage measurements were taken at each end of the channel with a caliper. The total shrinkage was computed and this was divided by 12 (the length of the channel) to determine the percent shrinkage.

Polyol A is an ethylene oxide adduct of toluenediamine, 90 percent vicinal isomers, having a molecular weight of about 500.

Polyol B is polyoxypropylene glycol having a molecular weight of about 400.

Polyol C is polyoxypropylene glycol having a molecular weight of about 700.

Polyol D is polyoxypropylene glycol having a molecular weight of about 1000.

Polyol E is polyoxypropylene glycol having a molecular weight of about 2000.

Polyol F is an ethylene oxide, propylene oxide adduct of propylene glycol containing 18 percent ethylene oxide, having a molecular weight of about 3500.
TIPA is triisopropanolamine. Isocyanate A is polymethylene polyphenylene polyisocyanate.

EXAMPLE 1-13

The polyols in the amounts as tabulated in Table I were blended together in a suitable container with 0.1 pbw of Dow Corning 290 fluid sold by Dow Corning Corp. and allowed to deaerate by placing the blend in an evacuated Bell jar at 0.1 mm pressure. The indicated amounts of polymethylene polyphenylene polyisocyanate were added, the mixture agitated for 20 to 80 seconds and then poured into suitable metal molds. The cast sealant were subsequently removed from the molds and allowed to cure for at least seven days. Physical properties were then determined on the products. All of the products except for those of Examples 1 and 6 were also blended with 1.25 parts of a pigment, DR-2205, sold by Plasticolors, Inc., and 3.0 parts of a 50:50 mixture of castor oil and powdered Type 3A molecular sieve. The sieve is sold by Union Carbide Corp.

Example 6 contained 0.3 parts of Dabco 33LV, a catalyst sold by Air Products Corp., 2.50 parts of pigment DR-2205, and 1.0 part of the 50:50 mixture of castor oil and powdered Type 3A molecular sieve.

TABLE I

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Formulation, pbw | | | | | | | | | | | | | |
| Polyol A | 40 | 40 | 35 | 30 | 40 | 33 | 35 | 35 | 35 | 35 | 35 | 35 | 35 |
| Polyol B | — | — | — | — | — | — | 55 | — | — | — | — | — | — |
| Polyol C | — | — | — | — | — | — | — | 55 | — | — | — | — | — |
| Polyol D | 50 | 50 | 55 | 60 | 55 | 50 | — | — | 55 | — | — | 40 | 40 |
| Polyol E | — | — | — | — | — | — | — | — | — | 55 | — | 15 | — |
| Polyol F | — | — | — | — | — | — | — | — | — | — | 55 | — | 15 |
| TIPA | 10 | 10 | 10 | 10 | 5 | 12 | 10 | 10 | 10 | 10 | 10 | 10 | 10 |
| Isocyanate A | 79 | 82 | 77 | 73 | 72 | 91 | 108 | 91 | 85 | 77 | 73 | 83 | 82 |
| Index | 105 | 110 | 110 | 110 | 100 | 125 | 125 | 120 | 120 | 120 | 120 | 120 | 120 |
| Physical Properties | | | | | | | | | | | | | |
| Tensile Strength, psi | 6870 | 7540 | 6410 | 4580 | 5450 | 5830 | 6680 | 7720 | 6815 | 2530 | 3335 | 3780 | 5260 |
| Elongation, % | 5 | 6 | 6 | 17 | 10 | 11 | 2 | 4.5 | 5.5 | 7 | 6 | 3 | 5.5 |
| Flexural Mod, psi × 10$^3$ | | | | | | | | | | | | | |
| 72° F. | 256 | 244 | 223 | 201 | 210 | 251 | 348 | 318 | 253 | 74 | 140 | 211 | 173 |
| 125° F. | 137 | 140 | 121 | 93 | 125 | 122 | 108 | 56 | 110 | 60 | 89 | 150 | 109 |
| 180° F. | 65 | 52 | 42 | 30 | 56 | 21 | 5.1 | 11 | 51 | 48 | 59 | 103 | 67 |
| Heat Distortion Temp., °F. 66 psi | 140 | 152 | 152 | 153 | 154 | 150 | 139 | 138 | 145 | 157 | 153 | 149 | 147 |
| Notched Izod Impact, ft. lb./in. | 0.75 | 0.65 | 0.85 | 1.17 | 0.77 | 0.97 | 0.31 | 0.48 | 1.05 | 1.13 | 1.40 | 0.88 | 1.38 |
| Hardness, Shore D | 70 | 75 | 72 | 66 | 63 | 82 | 62 | 63 | 65 | 55 | 67 | 71 | 68 |
| Initial Shrinkage, % | 0 | 0.7 | 0 | 0 | 0 | 0 | 0 | 0 | 0 | 0 | 0 | 0 | 0 |

The embodiments of the invention in which an exclusive privilege or property is claimed are defined as follows:

1. A low shrinkage polyurethane sealant composition comprising the reaction product of
    (a) a polyoxyalkylene polyether glycol,
    (b) an ethylene oxide adduct of toluenediamine having a molecular weight range from about 300 to about 700,
    (c) triisopropanolamine,
    (d) optionally, pigment, catalyst and inorganic filler, and
    (e) an organic polyisocyanate,
wherein the ratio of the polyether glycol to the adduct of toluenediamine is from about 2:1 to about 1:1, wherein the ratio of the adduct of toluenediamine to triisopropanolamine is from about 10:1 to about 2:1, and wherein the ratio of isocyanate groups to the hydroxyl groups of the polyether polyol is 1.0:1 to 1.5:1.

2. The polyurethane sealant composition of claim 1 wherein the organic polyisocyanate is polymethylene polyphenylene polyisocyanate.

3. A process for preparing a low shrinkage polyurethane sealant composition comprising reacting
    (a) a polyoxyalkylene polyether glycol,
    (b) an ethylene oxide adduct of toluenediamine having a molecular weight range from about 300 to 700,
    (c) triisopropanolamine,
    (d) optionally, pigment, catalyst and inorganic filler, and
    (e) an organic polyisocyanate,
wherein the ratio of the polyether glycol to the adduct of toluenediamine is from about 2:1 to about 1:1, wherein the ratio of the adduct of toluenediamine to triisopropanolamine is from about 10:1 to about 2:1, and wherein the ratio of isocyanate groups to the hydroxyl groups of the polyether polyol is 1.0:1 to 1.5:1.

4. The process of claim 3 wherein the organic polyisocyanate is polymethylene polyphenylene polyisocyanate.

5. A thermal break composition for use in the manufacture of door frames and windows which comprises a composition prepared by reacting
    (a) a polyoxyalkylene polyether glycol,
    (b) an ethylene oxide adduct of toluenediamine having a molecular weight range from about 300 to 700,
    (c) triisopropanolamine,
    (d) optionally pigment, catalyst and inorganic filler, and
    (e) an organic polyisocyanate,
wherein the ratio of the polyether glycol to the adduct of toluenediamine is from about 2:1 to about 1:1, wherein the ratio of the adduct of toluenediamine to triisopropanolamine is from about 10:1 to about 2:1, and wherein the ratio of isocyanate groups to the hydroxyl groups of the polyether glycol is 1.0:1 to 1.5:1.

6. The composition of claim 5 wherein the ratio of the polyether glycol to the adduct of toluenediamine is from about 2:1 to about 1:1.

7. The composition of claim 5 wherein the ratio of the adduct of toluenediamine to triisopropanolamine is from about 10:1 to about 2:1.

8. The composition of claim 5 wherein the organic polyisocyanate is polymethylene polyphenylene polyisocyanate.

* * * * *